US012115956B2

United States Patent
Olsson et al.

(10) Patent No.: US 12,115,956 B2
(45) Date of Patent: Oct. 15, 2024

(54) AIR-ACTUATED VEHICLE SYSTEM AND A METHOD OF DETECTING LEAKAGE IN AN AIR-ACTUATED VEHICLE SYSTEM

(71) Applicant: Volvo Truck Corporation, Gothenburg (SE)

(72) Inventors: Anders Olsson, Torslanda (SE); Alfred Skoglund, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 83 days.

(21) Appl. No.: 17/524,233

(22) Filed: Nov. 11, 2021

(65) Prior Publication Data

US 2022/0169228 A1   Jun. 2, 2022

(30) Foreign Application Priority Data

Dec. 2, 2020   (EP) .................................. 20211308

(51) Int. Cl.
   *B60T 17/18*   (2006.01)
   *B60G 17/015*   (2006.01)
   (Continued)

(52) U.S. Cl.
   CPC .......... *B60T 17/18* (2013.01); *B60G 17/0155* (2013.01); *B60T 13/261* (2013.01);
   (Continued)

(58) Field of Classification Search
   CPC ........ B60T 17/18; B60T 17/22; B60T 17/226; B60T 17/227; B60T 13/261;
   (Continued)

(56) References Cited

U.S. PATENT DOCUMENTS

| 5,735,540 A | * | 4/1998 | Schiffler | ............ | B60G 17/0185 |
| | | | | | 280/124.157 |
| 6,094,977 A | * | 8/2000 | Vaughn | ..................... | G01L 5/28 |
| | | | | | 73/121 |

(Continued)

FOREIGN PATENT DOCUMENTS

| CN | 203310575 U | | 11/2013 |
| CN | 207636258 U | * | 7/2018 |

(Continued)

OTHER PUBLICATIONS

Machine translation CN 207636258 U. (Year: 2018).*

(Continued)

*Primary Examiner* — Thomas J Williams
(74) *Attorney, Agent, or Firm* — Withrow & Terranova, PLLC

(57) ABSTRACT

The invention relates to an air-actuated vehicle system, comprising an actuating device which houses a pressurizable chamber, a pressurized air source, a conduit extending between the pressurized air source and the actuating device, for enabling the pressurizable chamber of the actuating device to be pressurized with air from the pressurized air source, and a pressure sensing arrangement measuring a first pressure inside the pressurized air source and a second pressure inside the pressurizable chamber, wherein the pressure sensing arrangement is configured to determine that the system has an air leakage when the result of the measurement(s) of said second pressure deviates from an expected result, wherein the expected result is based on the result of the measurement(s) of said first pressure. The invention also relates to a method of leakage detection.

10 Claims, 6 Drawing Sheets

(51) Int. Cl.
  *B60T 13/26* (2006.01)
  *B60T 17/22* (2006.01)
  *G01M 3/26* (2006.01)
(52) U.S. Cl.
  CPC .......... *B60T 13/268* (2013.01); *B60T 17/226* (2013.01); *G01M 3/26* (2013.01)
(58) Field of Classification Search
  CPC ....... B60T 13/268; G01M 17/04; G01M 3/26; G01M 3/2815; G01M 2400/51222
  See application file for complete search history.

(56) References Cited

U.S. PATENT DOCUMENTS

| | | | | |
|---|---|---|---|---|
| 6,123,397 | A * | 9/2000 | Ohtomo | .................... B60T 8/90 303/116.1 |
| 6,745,614 | B2 | 6/2004 | Stiller | |
| 2003/0107191 | A1 * | 6/2003 | Romer | ............... B60G 17/0523 280/5.514 |
| 2008/0190170 | A1 * | 8/2008 | Stiller | .................... G01M 17/04 73/117.03 |
| 2017/0166180 | A1 * | 6/2017 | Chang | .................. B60T 13/683 |
| 2018/0029571 | A1 * | 2/2018 | Schick | .................. B60T 8/1708 |

FOREIGN PATENT DOCUMENTS

| | | | | |
|---|---|---|---|---|
| DE | 19613769 | A1 | 10/1996 | |
| DE | 102005023692 | B3 * | 11/2006 | ............ G01M 3/243 |
| DE | 102005045269 | A | 3/2007 | |
| DE | 102010048818 | A1 * | 4/2012 | .............. B60T 17/22 |
| DE | 102017208499 | A1 * | 11/2017 | .............. B60T 11/28 |
| EP | 1190926 | A2 * | 3/2002 | .............. B60G 11/27 |
| EP | 3275745 | A1 * | 1/2018 | .............. B60T 13/12 |
| FR | 2735234 | A1 | 12/1996 | |
| JP | 2018016141 | A | 2/2018 | |
| KR | 20200134710 | A * | 12/2020 | .......... G01M 3/2815 |
| WO | WO-2020136475 | A1 * | 7/2020 | ............ F15B 19/005 |

OTHER PUBLICATIONS

Machine translation DE 10 2005023692B3. (Year: 2006).*
Machine translation DE 10 2010048818 A1. (Year: 2010).*
Extended European Search Report for European Patent Application No. 20211308.0, mailed May 27, 2021, 7 pages.
Intention to Grant for European Patent Application No. 20211308.0, mailed Apr. 30, 2024, 34 pages.

* cited by examiner

AIR-ACTUATED VEHICLE SYSTEM AND A METHOD OF DETECTING LEAKAGE IN AN AIR-ACTUATED VEHICLE SYSTEM

RELATED APPLICATIONS

The present application claims priority to European Patent Application No. 20211308.0, filed on Dec. 2, 2020, and entitled "AIR-ACTUATED VEHICLE SYSTEM AND A METHOD OF DETECTING LEAKAGE IN AN AIR-ACTUATED VEHICLE SYSTEM," which is incorporated herein by reference in its entirety.

TECHNICAL FIELD

The invention relates to an air-actuated vehicle system. The invention also relates to a vehicle comprising such an air-actuated vehicle system. The invention further relates to a method of detecting leakage in an air-actuated vehicle system. Moreover, the invention relates to a computer program, a computer readable medium and a control unit.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

Air suspension systems of vehicles normally comprise several air springs. Air leakage is a common issue leading to expensive work shop visits. Today air springs are often replaced even though they are not leaking, as this is a quick fix which pleases the customer. The alternative, i.e. the repair workers trying to find the cause of the leakage, is time consuming. Oftentimes leakage is detected by spraying soap water on the system and looking for bubbles. The accuracy of such a procedure is low and even the smallest leakage gives bubbles. This means that an air spring, such as a bellow, which has a small leakage, even though it is within the specifications, is replaced.

It would therefore be desirable to provide for an improved manner of detecting leakage, which is not time consuming, as this would save both labour costs and material costs.

JP 2018016141 A discloses a system for performing air leakage abnormality determination at an early stage in a vehicle suspension system. The system includes a pressure sensor which measures the pressure at a specific location at different points in time. If the pressure decreases over time, there may be a leakage. A disadvantage with this prior art measurement is that it needs to be performed over a certain period of time, and may still provide difficulties in distinguishing between leakages which are within allowable specifications and those that are not.

It would be desirable to have a more reliable determination of leakage than the prior art. Furthermore, it would be desirable to enable leakage detection not only for suspension systems, but also for other types of air-activated vehicle systems, such as for example air brake systems.

SUMMARY

An object of the invention is to provide a solution which at least partly mitigates the drawbacks of the prior art. The object is achieved by an air-actuated vehicle system and a method of detecting leakage.

The invention is based on the realization that by comparing a pressure present at a pressurized air source with a pressure present at an actuating device, such as an air spring or air brake, to which the pressurized air source supplies air, an efficient leakage detection is obtainable.

According to a first aspect of the present disclosure, there is provided an air-actuated vehicle system, which comprises:
an actuating device which houses a pressurizable chamber,
a pressurized air source,
a conduit extending between the pressurized air source and the actuating device, for enabling the pressurizable chamber of the actuating device to be pressurized with air from the pressurized air source, and
a pressure sensing arrangement measuring a first pressure inside the pressurized air source and a second pressure inside the pressurizable chamber, wherein the pressure sensing arrangement is configured to determine that the system has an air leakage when the result of the measurement(s) of said second pressure deviates from an expected result, wherein the expected result is based on the result of the measurement(s) of said first pressure.

By the provision of an air-actuated vehicle system which comprises a pressure sensing arrangement which provides for simultaneous measurements at different locations in the system, an efficient leakage detection is achievable. The leakage detection may even be performed as part of a vehicle's on-board diagnostics, and detection may thus be made during driving of the vehicle. As will be explained further down in this disclosure, this general inventive concept may be used for detecting or estimating a location for the leakage.

The expected result may in some exemplary embodiments be a specific pressure value. In some exemplary embodiments the expected result may be within a pressure interval. In some exemplary embodiments, the expected result may be a certain pressure profile over how the pressure is expected to vary over time. In some exemplary embodiments, the expected result may be an integrated value. In some exemplary embodiments, the expected result may be based on a trend analysis. In some exemplary embodiments, the expected result may be calculated by means of a global self-learning model, which notices changes in system behaviour.

Thus, it should be understood that there are various conceivable ways to determine if there is a leakage.

A simple manner may be that if the measured value of the first pressure exceeds the second pressure by a predefined amount then the pressure sensing arrangement may determine that there is an air leakage. Thus, in such cases, the expected result would be any value between the value of the first pressure and the value of the first pressure minus the predefined amount. Such a range may be suitable, as there may be tolerances and sensor measurement accuracies that need to be taken into account, and/or because the system specifications include a certain amount of allowable leakage.

In various system configurations, there may be delays between pressure changes in the pressurized air source and the pressurizable chamber, for instance if the pressurizable chamber is located at a relatively long distance from the pressurized air source. In such cases, it may be suitable to integrate the measurements of the first pressure over time, to calculate an expected result, which may be an expected pressure value or an expected pressure range. Similarly, if the pressure profile changes in a certain manner over time for the first pressure, then a certain profile may be expected from the second pressure. It should be noted that in this regard, "over time" does not necessarily imply a long extended time (as in the prior art measurements) but may be relatively short time periods. For instance, a pressure pulse will cause a changed pressure profile even though its duration is short.

According to at least one exemplary embodiment, the pressure sensing arrangement comprises:
  a first pressure sensor measuring said first pressure,
  a second pressure sensor measuring said second pressure, and
  a control unit receiving and comparing pressure inputs from the first and second pressure sensors.

By having a control unit onboard the vehicle, on-board diagnostics and leakage detection may be performed, even before taking the vehicle to a work shop.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to at least one exemplary embodiment, the control unit is configured to issue a warning signal when the pressure sensing arrangement has determined that the system has an air leakage. This is advantageous since it will alert the driver that it may be prudent to drive to a repair shop to have the leakage fixed. It should be noted that although the vehicle may suitably be driver-operated, the general inventive concept and its various example embodiments may advantageously also be implemented for an autonomous vehicle.

According to at least one exemplary embodiment, the air-actuated vehicle system further comprises a valve for closing off the conduit and thus the air communication between the pressurized air source and the pressurizable chamber. This is advantageous since, once it has been discovered that there is a leakage, i.e. that the result of the measurement or measurements of the second pressure deviates from the expected result, the valve may be closed to determine on which side of the valve the leakage is located. If the second pressure does not change over time after the valve has been switched from an open state to a closed state, then the leakage is on the other side of the valve, i.e. most likely in the conduit, and not in the pressurizable chamber of the actuating device.

According to at least one exemplary embodiment, the actuating device is an air spring or an air brake. These are components which are often replaced by repair workers as a quick fix, even though the leakage may be elsewhere, as explained above in connection with the discussion of the background of the invention. It is thus advantageous to implement the present general inventive concept for such type of components, in order to reduce the temptation of such seemingly unnecessary quick fixes. It should, however, be understood, that the general inventive concept may be implemented for any other suitable actuating device on a vehicle, provided that it has a pressurizable chamber which is supplied with pressurized air from a pressurized air source such as a compressor.

It should also be understood that the general inventive concept may be implemented for various types of pressurizable chambers. For instance, the pressurizable chamber may suitably be in the form of a variable volume chamber. An example of a variable volume chambers may be a chamber formed by a bellows, the volume of which may change by supplying or discharging air. A variable volume chamber may suitably be at least partly defined by a movable member. For instance, in some exemplary embodiments, such a movable member may be a piston or a diaphragm.

According to at least one exemplary embodiment, said actuating device is a first actuating device housing a first pressurizable chamber, the air-actuated vehicle system further comprising a second actuating device which houses a second pressurizable chamber, wherein said conduit or another conduit enables fluid communication between the pressurized air source and the second pressurizable chamber, wherein the pressure sensing arrangement measures a third pressure inside the second pressurizable chamber, wherein the pressure sensing arrangement is configured to determine that the system has an air leakage when a result of the measurement or measurements of said third pressure deviates from said expected result, or deviates from another expected result which is based on a result of the measurement or measurements of said first pressure. Thus, the pressure sensing arrangement may comprise a third pressure sensor which communicates with the above mentioned control unit. It should be understood that in a general sense, according to at least some exemplary embodiment, the pressure sensing arrangement may comprise an individual pressure sensor for each respective actuating device of the air-actuated vehicle system.

According to at least one exemplary embodiment, the first and second actuating devices are in fluid communication with each other, wherein the pressure sensing arrangement is configured to determine that when the difference in value between the second pressure and the third pressure exceeds a predefined threshold then there is a leakage at the one of the first and second pressurizable chambers that has the lowest pressure value. This is advantageous since it facilitates quickly identifying the approximate location of the leakage.

According to at least one exemplary embodiment, the pressure sensing arrangement is configured to determine that when there is an equal difference in pressure value between the first pressure compared to the second pressure, and the first pressure compared to the third pressure, then there is a leakage in the conduit. Again, this is advantageous since it facilitates quickly identifying the approximate location of the leakage.

According to at least one exemplary embodiment, the air-actuated vehicle system comprises a plurality of actuating devices housing a respective pressurizable chamber, wherein the pressurized air source is configured to pressurize each one of the pressurizable chambers, wherein the pressure sensing arrangement comprises a plurality of pressure sensors, each pressure sensor measuring the air pressure of a respective one of said pressurizable chambers, wherein the pressure sensing arrangement is configured to, based on pressure measurements at said pressurizable chambers and at said pressurized air source, determine which section of the system has a leakage. This too is advantageous as it facilitates quickly identifying the approximate location of the leakage, i.e. in which section of the system. For instance, each one the plurality of actuating devices may be associated with a respective conduit connecting the actuating device to the pressurized air source. In such case, each conduit/actuation device pair may be regarded as one section.

According to a second aspect of the present disclosure there is provided a vehicle comprising the air-actuated vehicle system according to the first aspect, including any embodiment thereof. The advantages of the vehicle of the second aspect are largely analogous to the advantages of the air-actuated vehicle system of the first aspect, including any embodiment thereof.

According to a third aspect of the present disclosure, there is provide a method of detecting leakage in an air-actuated vehicle system which comprises
- an actuating device, such as an air spring or an air brake, which houses a pressurizable chamber,
- a pressurized air source, and
- a conduit extending between the pressurized air source and the actuating device, for enabling the pressurizable chamber of the actuating device to be pressurized with air from the pressurized air source, the method comprising:
- measuring, such as by means of pressure sensors, a first pressure present inside the pressurized air source and a second pressure present inside the pressurizable chamber,
- determining, based on the result of the measurement(s) of said first pressure, an expected result, and
- determining that the system has an air leakage when the result of the measurement(s) of said second pressure deviates from said expected result.

The advantages of the method of the third aspect, including any embodiment thereof, are largely analogous to the advantages of the air-actuated vehicle system of the first aspect and the vehicle of the second aspect, including any embodiment thereof.

According to at least one exemplary embodiment, after determining that the system has an air leakage, the method further comprises:
- closing off, such as by means of a valve, the conduit and thus the air communication between the pressurized air source and the pressurizable chamber,
- continuing measuring the second pressure inside the pressurizable chamber after the conduit has been closed off,
- determining that it is the pressurizable chamber that has the air leakage when the value of the second pressure decreases over time, or that it is another part of the system, such as the conduit, that has the air leakage when the second pressure remains constant. This is advantageous since it not only detects the presence of leakage, but also facilitates in finding the location of the leakage.

The method according to the third aspect includes a plurality of different exemplary embodiments, which will not be discussed in detail. According to at least some exemplary embodiments, the method is performed for any one of the exemplary embodiments of the air-actuated vehicle system according to the first aspect. For instance, the in some exemplary embodiments the method may comprise the step of issuing a warning signal when it is determined that the system has a leakage (which is outside any allowable range set in the specifications).

According to a fourth aspect of the present disclosure, there is provided a computer program comprising program code means for performing the steps of the method of the third aspect, including any embodiment thereof, when said program is run on a computer. The advantages of the computer program of the fourth aspect are largely analogous to the advantages of the previously mentioned aspects.

According to a fifth aspect of the present disclosure there is provided computer readable medium carrying a computer program comprising program code means for performing the steps of the method of the third aspect, including any embodiment thereof, when said program product is run on a computer. The advantages of the computer readable medium of the fifth aspect are largely analogous to the advantages of the previously mentioned aspects.

According to a sixth aspect of the present disclosure there is provided a control unit for detecting leakage in an air-actuated vehicle system, the control unit being configured to perform the steps of the method according to the third aspect, including any embodiment thereof. The advantages of the control unit of the sixth aspect are largely analogous to the advantages of the previously mentioned aspects.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
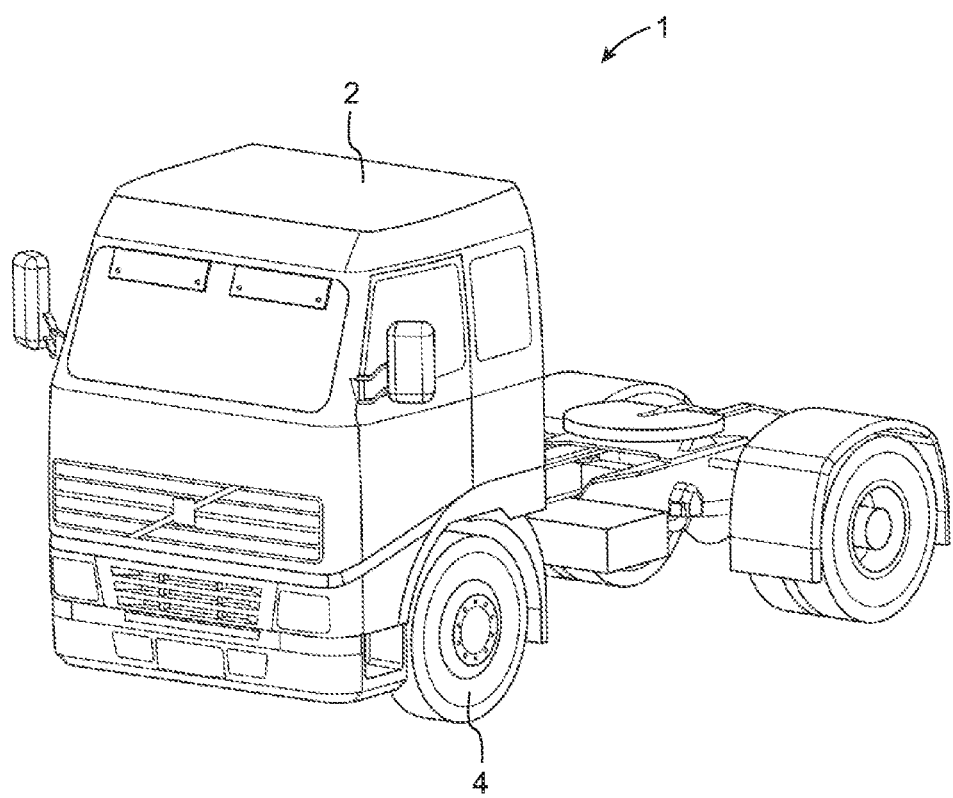
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

Figure 2:
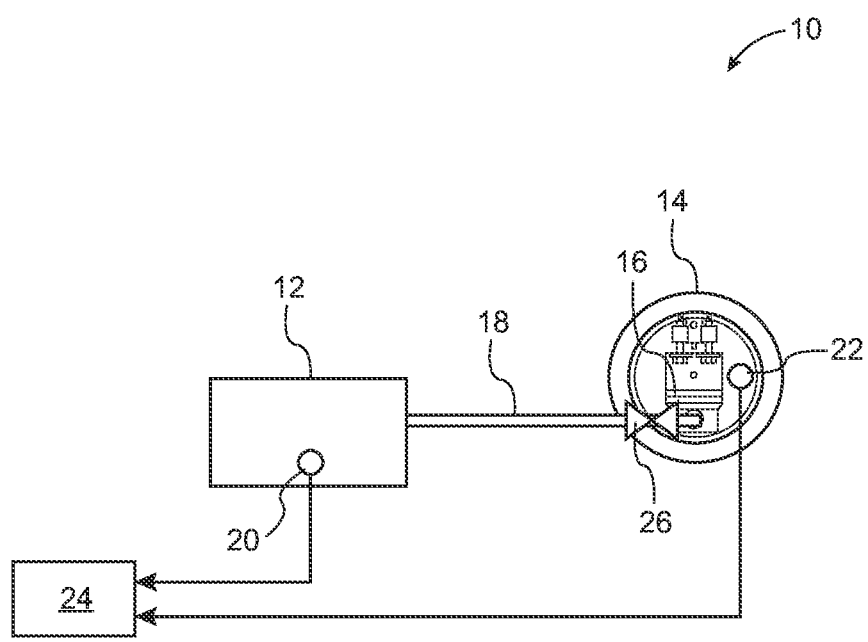
FIG. 2 illustrates an air-actuated vehicle system in accordance with at least one exemplary embodiment of the invention.
Figure 3:
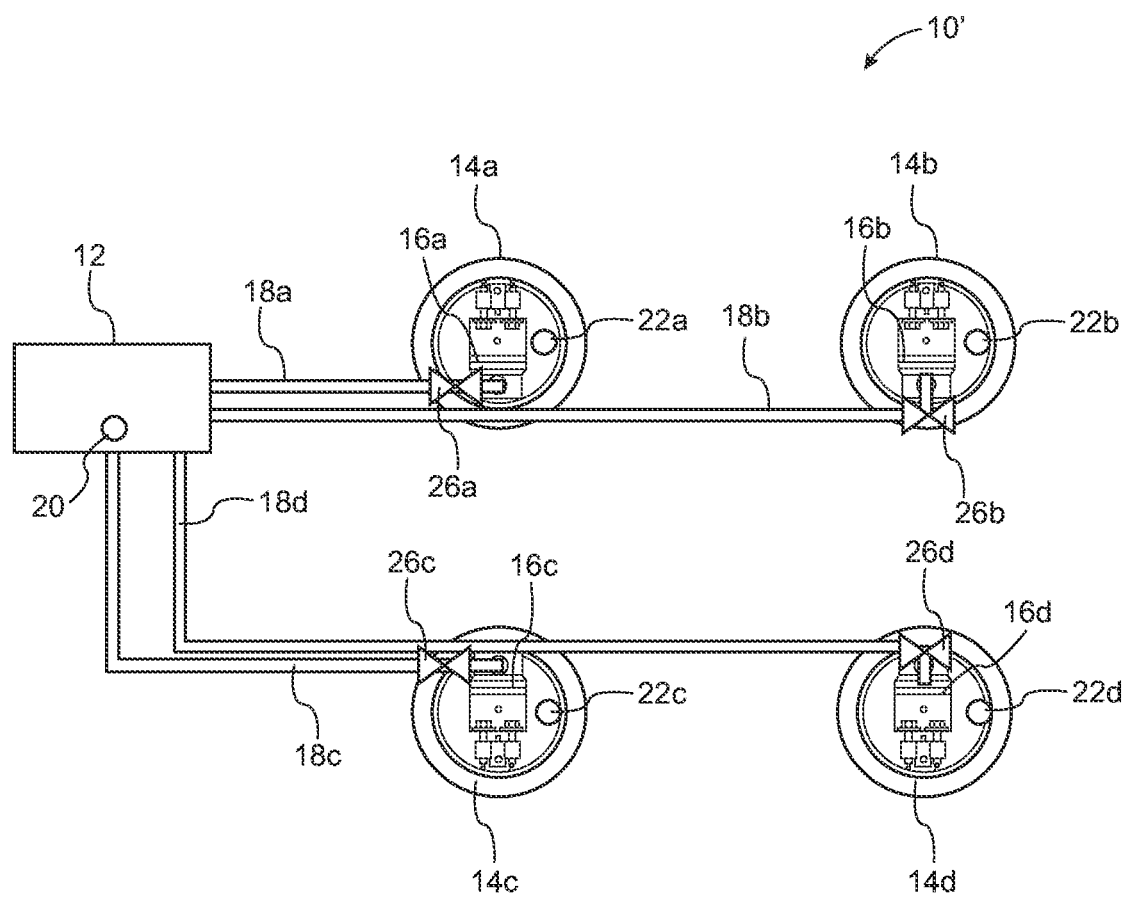
FIG. 3 illustrates an air-actuated vehicle system in accordance with at least another exemplary embodiment of the invention.
Figure 4:
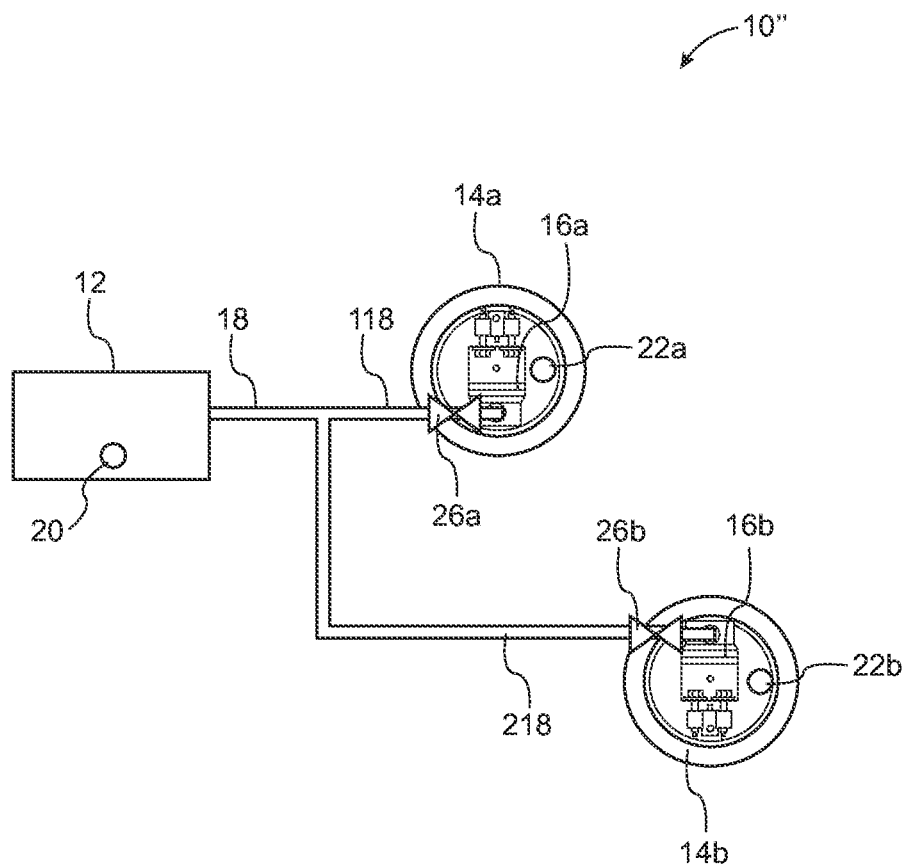
FIG. 4 illustrates an air-actuated vehicle system in accordance with yet another exemplary embodiment of the invention.

The truck (vehicle 1) comprises a cab 2 in which a driver may operate the vehicle 1. The vehicle comprises a number of road wheels 4, herein illustrated as two pairs of wheels, however, in other embodiments there may be a different number of wheels, such as three pairs, four pairs or more. The vehicle 1 may comprise an air-actuated vehicle system, such as any one of the examples that are schematically illustrated in FIGS. 2-4. For instance, each road wheel 4 may be associated with an actuating device which houses a pressurizable chamber. Such an actuating device may, for instance, be an air spring for smooth driving or an air brake for braking the vehicle. Although FIG. 1 may illustrate a human-operated vehicle 1, in other exemplary embodiments, the vehicle 1 in FIG. 1 may represent an autonomous vehicle.

FIG. 2 illustrates an air-actuated vehicle system 10 in accordance with at least one exemplary embodiment of the invention. The air-actuated vehicle system 10 comprises a pressurized air source 12, such as a compressor, and an actuating device 14 which houses a pressurizable chamber 16. The actuating device 14 may, for instance, as exemplified in FIG. 1, be an air spring, such as including a bellows as a pressurizable chamber. However, the general principles of this disclosure is equally applicable to other types of actuating devices having pressurizable air chambers. For instance, as previously mentioned, the actuating device 14 could be an air brake.

A conduit 18 extends between the pressurized air source 12 and the actuating device 14. Pressurized air may thus pass from the pressurized air source 12, via the conduit 18, to the pressurizable chamber 16 of the actuating device 14. The pressure in the pressurizable chamber 16 of the actuating device 14 may thus be controlled by means of the pressurized air source 12. Additionally, the actuating device 12 may, in some exemplary embodiments, be provided with a relief valve for controlling the pressure.

Although for at least some actuating devices a certain amount of leakage may be allowable, if within specifications defined by the manufacturer, excessive leakage needs to be handled appropriately and it is desirable to detect such leakage in a timely manner. Similarly, as regards actuating devices for which no leakage is allowed at all, it is desirable to efficiently and quickly detect any leakage, so that the actuating device can be repaired. If the leakage is present in other parts of the system than in the actual actuating device, this too should be detectable.

To this end, the exemplified air-actuated vehicle system 10 comprises a pressure sensing arrangement, here illustrated as comprising a first pressure sensor 20, a second pressure sensor 22 and a control unit 24. The first pressure sensor 20 is configured to measure a first pressure inside the pressurized air source 12. The second pressure sensor 22 is configured to measure a second pressure inside the pressurizable chamber 16 of the actuating device 14. The control unit 24 is configured to receive and compare pressure inputs from the first and second pressure sensors 20, 22. It should be understood that other setups and configurations are, however, conceivable as long as the pressure sensing arrangement is capable of measuring the first pressure inside the pressurized air source 12 and the second pressure inside the pressurizable chamber 22.

The pressure sensing arrangement is configured to determine that the system 10 has an air leakage when the result of the measurement (or measurements) of the second pressure deviates from an expected result. The expected result is based on the result of the measurement (or measurements) of the first pressure. As previously explained in this disclosure under the heading "SUMMARY", the expected result may, for instance, be an expected pressure value, an expected pressure range, an expected pressure profile, etc.

In the illustrated exemplary embodiment, this determination may be made by the control unit 24 or any processor that is in operative communication with the control unit. The inputs from the first and second pressure sensors 20, 22 to the control unit 24 may either be continuous signals or intermittent/discrete signals. The first and second pressure sensors 20, 22 may communicate with the control unit 24 by wire or wirelessly.

The control unit 24 may be configured to issue a warning signal when the pressure sensing arrangement has determined that there is a leakage in the system. The warning signal may, for instance, be sent to a user interface onboard the vehicle, in the form of an audible or visual signal, or it may be sent to an off board site, such as to a fleet management system.

The control unit 24 may comprise or may be comprised in a processing circuitry. The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with the control unit 24.

As illustrated in FIG. 2, the air-actuated vehicle system 10 comprises a valve 26 for closing off the conduit 18 and thus the air communication between the pressurized air source 12 and the pressurizable chamber 16. When the pressure sensing arrangement has detected that there is a leakage in the air-actuated vehicle system 10, the valve 26 may be closed and the second pressure in the pressurizable chamber 16 of the actuating device 14 may be monitored while the valve 26 remains in the closed state. If the leakage is located in the pressurizable chamber 16, then the second pressure will decrease over time. If the leakage is located in the conduit 18 on the other side of the valve 26, then the pressure in the pressurizable chamber 16 will remain constant after closing the valve 26. Thus, the valve 26 facilitates in finding the leakage point. In at least some exemplary embodiments, the opening and the closing of the valve 26 may be controlled by the control unit 24.

The valve 26 may suitably be located in the vicinity of the pressurizable chamber 16, such as near the interface between the conduit 18 and the actuating device 14. In other exemplary embodiments the air actuated-vehicle system 10 may have additional valves. For instance, an additional valve may be provided near the pressurized air source 12. It would also be conceivable to provide an additional pressure sensor between the illustrated valve 26 and said additional valve, for measuring the pressure present in the conduit 18. Such a setup with an additional valve and an additional pressure sensor may further facilitate locating the point of leakage.

FIG. 3 illustrates an air-actuated vehicle system 10' in accordance with at least another exemplary embodiment of the invention. Similarly to FIG. 2 a separate control unit (not illustrated) may be provided, or it may for instance be integrated in a common module with the pressurized air source 12.

In this exemplary embodiment, the air-actuated vehicle system 10' comprises a plurality of actuating devices 14a-14d. Although four actuating devices 14a-14d are shown in FIG. 3, in other exemplary embodiments the number of actuating devices may be different, such as two, three, five, six or more, the general inventive principles being the same. As shown in FIG. 3, each actuating device 14a-14d is provided with a respective pressure sensor 22a-22d for measuring the respective pressure of the air in the pressurizable chamber 16a-16d of the actuating device 14a-14d. Furthermore, there is provided a respective valve 26a-26d associated with each actuating device 14a-14d for closing of the air communication between the pressurized air source 12 and the respective actuating device 14a-14d. In the present example, each actuating device 14a-14d receives the air from the pressurized air source 12 via a respective conduit 18a-18d. However, in other exemplary embodiments there may be one or more conduits that is/are common to two or more actuating devices.

Thus, from the above it is understood that in at least some exemplary embodiments, the air-actuated vehicle system 10' comprises a plurality of actuating devices 14a-14d housing a respective pressurizable chamber 16a-16d, wherein the pressurized air source 12 is configured to pressurize each one of the pressurizable chambers 16a-16d, wherein the pressure sensing arrangement comprises a plurality of pressure sensors 22a-22d, each pressure sensor 22a-22d measuring the air pressure of a respective one of said pressurizable chambers 16a-16d, wherein the pressure sensing arrangement is configured to, based on pressure measurements at said pressurizable chambers 16a-16d and at said pressurized air source 12, determine which section of the system 10' has a leakage. Thus, if there is a leakage in a conduit 18a-18d between the pressurized air source 12 and one of the actuating devices 14a-14d, or a leakage in the pressurizable chamber 16a-16 of that actuating device 14a-14d, then there may be a measurable pressure difference between the first pressure in the pressurized air source 12 and the second pressure in the pressurizable chamber of that actuating device. It is thus possible to determine which one of the four sections of the air-actuated vehicle system 10' that has a leakage. A section may in this regard be regarded as comprising an actuating device and a conduit connecting that actuating device with the pressurized air source 12. When it has been determined that there is a leakage in one of the sections, the valve in that section may be closed for improving the location finding of where in that section the leakage point is located, analogously to the previous explanation with respect to the valve in FIG. 2.

In FIG. 3 separate conduits 18a-18d are provided for communicating air to the respective actuating device 14a-14d. In other exemplary embodiments, such as in FIG. 4 there may be a common conduit to two or more actuating devices.

FIG. 4 illustrates an air-actuated vehicle system 10" in accordance with yet another exemplary embodiment of the invention. A common conduit 18 from the pressurized air source is divided into two branches 118, 218, one for each actuating device 14a, 14b.

Although only two actuating devices 14a, 14b are illustrated for simplicity, it would be conceivable to have four branches in embodiments having four actuating devices.

Thus, from FIGS. 3 and 4 it can be understood that according to at least some exemplary embodiments, the air-actuated vehicle system 10', 10" comprises a first actuating device 14a housing a first pressurizable chamber 16a and at least a second actuating device 14b which houses a second pressurizable chamber 16b, wherein the conduit 18 supplying the first pressurizable chamber 16a with air, or another conduit (e.g. 18b in FIG. 3), enables fluid communication between the pressurized air source 12 and the second pressurizable chamber 16b, wherein the pressure sensing arrangement measures a third pressure inside the second pressurizable chamber 16b, wherein the pressure sensing arrangement is configured to determine that the system has an air leakage when a result of the measurement (or measurements) of said third pressure deviates from said expected result, or deviates from another expected result based on the measurement (or measurements) of said first pressure. Although not illustrated in FIG. 4, the pressure sensing arrangement of the air-actuated vehicle system 10" may, in addition to the first pressure sensor 20 and the second and third pressure sensors 22a, 22b, also comprise a separate control unit similar to the one illustrated for the embodiment in FIG. 2, or a control unit may be integrated in a common module with the pressurized air source 12.

In FIG. 4 a respective valve 26a, 26b is associated with each actuating device 14a, 14b. When the valves are open, the actuating devices 14a, 14b are in fluid communication with each other. The pressure sensing arrangement is configured to determine that when there is a pressure difference between the pressures in the pressurizable chambers 16a, 16b of the actuating devices 14a, 14b, then there is a leakage at the pressurizable chamber that has the lowest pressure value. However, when the pressurizable chambers 16a, 16b have the same pressure value and said pressure value is lower than the pressure in the pressurized air source 12, then the pressure sensing arrangement is configured to determine that there is a leakage in the conduit 18 118, 218.

Figure 5:
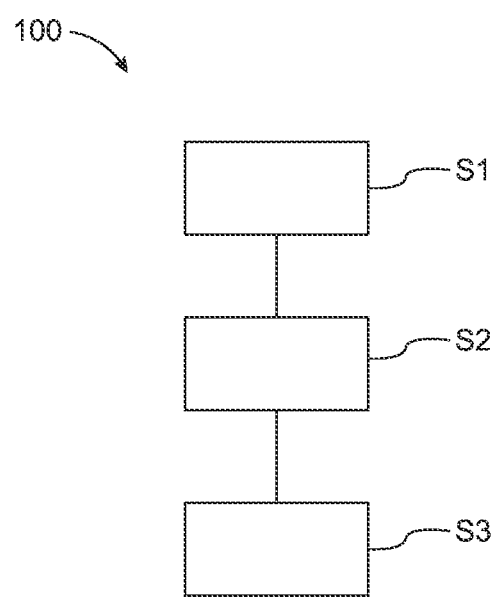
FIG. 5 illustrates a method in accordance with at least one exemplary embodiment of the invention.

FIG. 5 illustrates a method 100 in accordance with at least one exemplary embodiment of the invention. More specifically, FIG. 5 illustrates a method 100 of detecting leakage in an air-actuated vehicle system which comprises an actuating device, such as an air spring or an air brake, which houses a pressurizable chamber,
a pressurized air source, and
a conduit extending between the pressurized air source and the actuating device, for enabling the pressurizable chamber of the actuating device to be pressurized with air from the pressurized air source, the method comprising:

in a first step S1, measuring, such as by means of pressure sensors, a first pressure present inside the pressurized air source and a second pressure present inside the pressurizable chamber,
in a second step S2, determining, based on the result of the measurement(s) of said first pressure, an expected result, and
in a third step S3, determining that the system has an air leakage when the result of the measurement(s) of said second pressure deviates from said expected result. The method 100 may, for instance be performed by a control unit, such as the one illustrated in FIG. 2.

Figure 6:
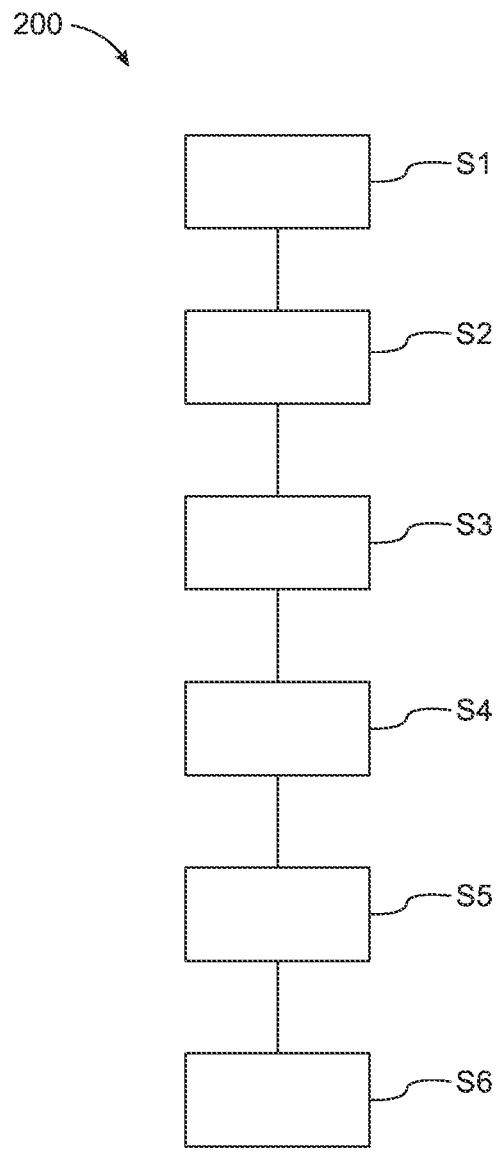
FIG. 6 illustrates a method in accordance with at least one another exemplary embodiment of the invention.

FIG. 6 illustrates a method 200 in accordance with at least another exemplary embodiment of the invention. This exemplary embodiment includes steps S1-S3 from FIG. 5, but also has some additional steps. More specifically, after step S3 (determining that the system has an air leakage), the method 200 further comprises:

in a step S4, closing off, such as by means of a valve, the conduit and thus the air communication between the pressurized air source and the pressurizable chamber,
in a step S5, continuing measuring the second pressure inside the pressurizable chamber after the conduit has been closed off,
in a step S6, determining that it is the pressurizable chamber that has the air leakage when the value of the second pressure decreases over time, or that it is another part of the system, such as the conduit, that has the air leakage when the second pressure remains constant.

Also this exemplary embodiment may be performed by the control unit illustrated in FIG. 2.

It is to be understood that the present invention is not limited to the embodiments described above and illustrated in the drawings; rather, the skilled person will recognize that many changes and modifications may be made within the scope of the appended claims.

The invention claimed is:

1. An air-actuated vehicle system, comprising:
   an actuating device housing a pressurizable chamber, wherein the actuating device is a first actuating device housing a first pressurizable chamber, and the air-actuated vehicle system further comprising a second actuating device housing a second pressurizable chamber, wherein the first and second actuating devices are in fluid communication with each other;
   a pressurized air source;
   a conduit extending between the pressurized air source and the actuating device for enabling the pressurizable chamber of the actuating device to be pressurized with air from the pressurized air source, wherein the conduit or another conduit enables fluid communication between the pressurized air source and the second pressurizable chamber; and
   a pressure sensing arrangement measuring a first pressure inside the pressurized air source, measuring a second pressure inside the pressurizable chamber, and measuring a third pressure inside the second pressurizable chamber, the pressure sensing arrangement configured to determine that the system has an air leakage when a result of a measurement of the second pressure deviates from an expected result, the expected result based on a result of a measurement of the first pressure obtained simultaneously with the measurement of the second pressure;
   wherein the pressure sensing arrangement is configured to determine that when there is an equal difference in pressure value between the first pressure compared to the second pressure, and the first pressure compared to the third pressure, then there is a leakage in the conduit.

2. The air-actuated vehicle system of claim 1, wherein the pressure sensing arrangement comprises:
   a first pressure sensor measuring the first pressure,
   a second pressure sensor measuring the second pressure, and
   a control unit receiving and comparing pressure inputs from the first and second pressure sensors for simultaneously obtained first and second pressure values.

3. The air-actuated vehicle system of claim 2, wherein the control unit is configured to issue a warning signal when the pressure sensing arrangement has determined that the system has an air leakage.

4. The air-actuated vehicle system of claim 1, further comprising a valve for closing off the conduit and thus the air communication between the pressurized air source and the pressurizable chamber.

5. The air-actuated vehicle system of claim 1, wherein the actuating device is an air spring or an air brake.

6. The air-actuated vehicle system of claim 1, wherein the pressure sensing arrangement is configured to determine that the system has an air leakage when a result of a measurement of the third pressure deviates from the expected result or another expected result based on a result of the measurement of the first pressure.

7. The air-actuated vehicle system of claim 6, wherein the pressure sensing arrangement is configured to determine that when the difference in value between the second pressure and the third pressure exceeds a predefined threshold, then there is a leakage at the one of the first and second pressurizable chambers that has the lowest pressure value.

8. The air-actuated vehicle system of claim 1, wherein the pressurized air source is configured to pressurize each one of the first and second pressurizable chambers, wherein the pressure sensing arrangement comprises a plurality of pressure sensors, each pressure sensor measuring the air pressure of a respective one of the first and second pressurizable chambers, wherein the pressure sensing arrangement is configured to, based on pressure measurements at the pressurizable chambers and at the pressurized air source, determine which section of the system has a leakage.

9. A vehicle comprising:
   an air-actuated vehicle system according to claim 1.

10. A method of detecting leakage in an air-actuated vehicle system, comprising:
    measuring, by a first pressure sensor, a first pressure present inside a pressurized air source;
    measuring, by a second pressure sensor, a second pressure present inside a pressurizable chamber housed by an actuating device, a conduit extending between the pressurized air source and the actuating device for enabling the pressurizable chamber of the actuating device to be pressurized with air from the pressurized air source;
    determining, by a control unit, based on a result of a measurement of the first pressure, an expected result; and
    determining that the system has an air leakage when a result of a measurement of the second pressure obtained simultaneously with the measurement of the first pressure deviates from the expected result;
    wherein after determining that the system has an air leakage, the method further comprises:
      closing off the conduit and thus the air communication between the pressurized air source and the pressurizable chamber,
      continuing measuring the second pressure inside the pressurizable chamber after the conduit has been closed off, and
      determining that it is the pressurizable chamber that has the air leakage when the value of the second pressure decreases over time, or that it is another part of the system, that has the air leakage when the second pressure remains constant.

* * * * *